US011049625B2

(12) United States Patent
Kim et al.

(10) Patent No.: US 11,049,625 B2
(45) Date of Patent: Jun. 29, 2021

(54) NUCLEAR FUEL PELLET WITH CENTRAL BURNABLE ABSORBER

(71) Applicant: Korea Advanced Institute of Science and Technology, Daejeon (KR)

(72) Inventors: Yonghee Kim, Daejeon (KR); Ho Jin Ryu, Daejeon (KR); Mohd Syukri bin Yahya, Selangor (MY); Qusai Mahmoud Mohammad Mistarihi, Daejeon (KR); Chihyung Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 421 days.

(21) Appl. No.: 15/819,323

(22) Filed: Nov. 21, 2017

(65) Prior Publication Data
US 2018/0151261 A1 May 31, 2018

(30) Foreign Application Priority Data

Nov. 25, 2016 (KR) .................. 10-2016-0158622
Nov. 25, 2016 (KR) .................. 10-2016-0158623

(51) Int. Cl.
G21C 21/02 (2006.01)
G21C 7/04 (2006.01)
(Continued)

(52) U.S. Cl.
CPC ............ *G21C 21/02* (2013.01); *G21C 3/045* (2019.01); *G21C 7/04* (2013.01); *G21C 3/20* (2013.01); *G21C 3/58* (2013.01)

(58) Field of Classification Search
CPC . G21C 3/20; G21C 7/04; G21C 21/02; G21C 3/58; G21C 3/045; G21C 3/326
(Continued)

(56) References Cited

U.S. PATENT DOCUMENTS 2,984,613 A * 5/1961 Bassett ............... G21C 3/20
376/419
3,759,786 A * 9/1973 Abate-Daga .......... G21C 3/623
376/419
(Continued)

FOREIGN PATENT DOCUMENTS

JP S601591 A * 1/1985 ............ Y02E 30/38
JP H01232289 A 9/1989
(Continued)

Primary Examiner — Jack W Keith
Assistant Examiner — Daniel Wasil
(74) Attorney, Agent, or Firm — Fredrikson & Byron, P.A.

(57) ABSTRACT

The present invention relates to a sintered nuclear fuel pellet wherein one or more consolidated bodies of a burnable absorber are inserted inside, wherein the one or more consolidated bodies of the burnable absorber do not include nuclear fuel which includes $UO_2$, and the one or more consolidated bodies of the burnable absorber are inserted into a radially central region of the sintered nuclear fuel pellet, such that the one or more consolidated bodies are surrounded by the nuclear fuel pellet without being exposed to an outside of the sintered nuclear fuel pellet. The present invention can optimize the regulation of excess reactivity by optimizing the self-shielding and the burning speed of the burnable absorber using one or more consolidated bodies the burnable absorber.

14 Claims, 10 Drawing Sheets

(51) Int. Cl.
*G21C 3/04* (2006.01)
*G21C 3/20* (2006.01)
*G21C 3/58* (2006.01)

(58) Field of Classification Search
USPC .......................................................... 376/419
See application file for complete search history.

(56) References Cited

U.S. PATENT DOCUMENTS

| | | | |
|---|---|---|---|
| 4,587,087 A | 5/1986 | Radford et al. | |
| 4,671,927 A * | 6/1987 | Alsop | G21C 3/18 |
| | | | 376/419 |
| 4,678,629 A * | 7/1987 | Popa | G21C 3/18 |
| | | | 376/419 |
| 5,009,840 A | 4/1991 | Ueda et al. | |
| 5,075,075 A * | 12/1991 | Kapil | G21C 3/18 |
| | | | 376/419 |
| 5,309,493 A * | 5/1994 | Kamimura | G21C 3/18 |
| | | | 376/419 |
| 9,042,507 B2 * | 5/2015 | Doerr | G21C 3/04 |
| | | | 376/409 |
| 2018/0330832 A1 | 11/2018 | Enica et al. | |

FOREIGN PATENT DOCUMENTS

| | | |
|---|---|---|
| JP | 4212093 A | 8/1992 |
| JP | 3304566 A | 11/1997 |
| KR | 1019990085212 A | 12/1999 |
| KR | 1020010001112 A | 1/2001 |
| KR | 1020090037633 A | 4/2009 |
| KR | 10200090037633 A | 4/2009 |
| KR | 1020110070984 A | 6/2011 |

\* cited by examiner 1 spherical ball    2 spherical balls    3 spherical balls

Cylindrical core    Surface mini-pellets    Mini-pellet core ized light water reactors, gadolinium (Er) and erbium (Er) are properly mixed with $UO_2$ nuclear fuel in the form of $Gd_2O_3$ and $Er_2O_3$. In the meantime, erbium, one of the rare-earth burnable absorbers, is not frequently used because it has a relatively high residual toxic activity, but it can be used as a relatively efficient burnable absorber in a core having a long cycle length. Gadolinium has a low residual toxic activity, so that it is frequently used as a burnable absorber. When gadolinium is mixed with nuclear fuel, the thermal conductivity of the nuclear fuel decreases, suggesting that the power density of the nuclear fuel mixed with gadolinium is very low. Therefore, when gadolinium is used, it is hard to use a large amount of gadolinium. Also, when the nuclear fuel is mixed with $Gd_2O_3$, gadolinium is fast burned, indicating that it is hardly used for such a nuclear reactor that has a long core cycle length.

NUCLEAR FUEL PELLET WITH CENTRAL BURNABLE ABSORBER

BACKGROUND OF THE INVENTION

1. Field of the Invention

The present invention relates to a sintered nuclear fuel pellet including a burnable absorber capable of controlling self-shielding and a manufacturing method thereof.

2. Description of the Related Art

A nuclear reactor is a reactor that uses the nuclear fission of nuclear fuel to get energy. In the nuclear reactor, energy is generated by the chain reaction of a series of nuclear fissions induced by the neutrons emitted during the nuclear fission. At this time, it is necessary to control properly the reactor core reactivity and the nuclear reactor power distribution in order to operate the nuclear reactor safely and economically.

In a general nuclear reactor, the reactivity is controlled by inserting or withdrawing a control rod made of a neutron absorbing material mechanically. Control of the reactor core reactivity by using such a control rod has the advantage of quick control of the reactor core reactivity. However, such a control rod is locally inserted into the reactor core, so that the insertion of the control rod itself is not enough to control the reactor core reactivity and the power distribution simultaneously. When the excess reactivity is high, the mechanical movement of the control rod has to grow, and accordingly the uncertainty of controlling the reactivity is increased, indicating the risk of accident is also increased.

So, in the conventional nuclear reactor, other methods are used to lower the excess reactivity and then control the reactivity using a control rod. It is one of the well known methods in this field to mix a coolant with a boric acid solution, a neutron absorbing material. When the reactor core reactivity is controlled by regulating the concentration of boron included in the coolant, the reactivity can be controlled while minimizing the distortion of the reactor core power distribution since boron is evenly distributed in the coolant of the nuclear reactor. However, distribution of boron in the coolant and the following dilution take a long time. So, if a quick control of the reactor core reactivity is requested, the method using boric acid to control the reactor core reactivity is not able to be used. Another problem of using boron to control the reactor core reactivity is that a massive radioactive liquid waste is generated in the course of lowering the concentration of boron. In order to regulate the concentration of water-soluble boron in the primary coolant system, such an expensive device as 'chemical and volume control system (CVCS)' is required. To neutralize pH of the coolant containing boron (boric acid solution), which is acidic, LiH has to be added to the coolant. At this time, LiH reacts with neutrons to generate large amounts of tritium and the boric acid solution itself causes corrosion of structural materials and nuclear fuel cladding tubes forming the primary coolant system of the nuclear reactor, resulting in the deterioration of operation performance of the nuclear reactor. If the concentration of boron in the coolant is very high, the coolant temperature coefficient might be very close to zero or positive, which is not preferred for the viewpoint of safety. Therefore, overcoming the problem above has been an issue related to the safety of the pressurized light water reactor.

It is very natural to consider non-boric acid or low-boric acid operation to improve the safety of nuclear reactors. So, a burnable absorber has been generally tried. The burnable absorber acts as a strong neutron absorber. However, once it absorbs neutrons and converted to other nuclides, the neutron absorption cross section is reduced significantly. The most representative burnable absorbers are exemplified by gadolinium (Gd), erbium (Er), and boron (B). In pressurized light water reactors, gadolinium (Er) and erbium (Er) are properly mixed with $UO_2$ nuclear fuel in the form of $Gd_2O_3$ and $Er_2O_3$. In the meantime, erbium, one of the rare-earth burnable absorbers, is not frequently used because it has a relatively high residual toxic activity, but it can be used as a relatively efficient burnable absorber in a core having a long cycle length. Gadolinium has a low residual toxic activity, so that it is frequently used as a burnable absorber. When gadolinium is mixed with nuclear fuel, the thermal conductivity of the nuclear fuel decreases, suggesting that the power density of the nuclear fuel mixed with gadolinium is very low. Therefore, when gadolinium is used, it is hard to use a large amount of gadolinium. Also, when the nuclear fuel is mixed with $Gd_2O_3$, gadolinium is fast burned, indicating that it is hardly used for such a nuclear reactor that has a long core cycle length.

Boron is used as IFBA (Integrated Fuel Burnable Absorber), wherein $ZrB_2$ is coated very thinly on $UO_2$ fuel rod. Boron is also used in another way, wherein a boron compound such as $B_4C$ may is prepared in a special shape and loaded in the control rod guide tube. A typical concept thereof is WABA (Wet Annular Burnable Absorber). When boron absorbs neutrons, helium gas is generated. Therefore, it is difficult to mix boron with nuclear fuel, so it is used in the same way of IFBA or WABA. The neutron absorption cross section of boron is relatively small, so when it is used in the IFBA form, a comparatively large number of fuel rods must be loaded with IFBA. When it is used in the WABA form, so that it is loaded in the control rod guide tube as a burnable absorber, the insertion of the control rod might be limited. Thus, when boron is used in the manner of WABA, the use of a burnable absorber is limited.

As described hereinbefore, various types of burnable absorbers have been used in nuclear fuel assemblies, but they are used in a limited manner in their use. Therefore, it is an object of the present invention to provide a novel burnable absorber that can control the core reactivity and power distribution more efficiently.

SUMMARY OF THE INVENTION

To overcome the problems above, the present invention provides a sintered nuclear fuel pellet that can be loaded in the conventional nuclear reactors without major design changes and can optimize the excess reactivity to match the characteristics of each nuclear reactor.

The present invention also provides a manufacturing method of the sintered nuclear fuel pellet capable of preventing the occurrence of cracks due to the difference in thermal expansion and phase transformation during sintering and use and solving unevenness in the degree of combustion of nuclear fuel.

The objects that the present inventors try to solve are not limited to the above and it is clearly understood by those in the art that other objects supported by the following descriptions can also be included.

The present invention relates to a sintered nuclear fuel pellet wherein a consolidated body of a burnable absorber is inserted.

In a preferred embodiment of the present invention, the consolidated body of the burnable absorber can be included in one or more forms selected from the group consisting of amorphous, cylinder, disk, spherical, rod, film, and polyprism.

In a preferred embodiment of the present invention, the consolidated body of the burnable absorber can be inserted in the sintered nuclear fuel pellet at the volume of up to 50% by the total volume of the sintered nuclear fuel pellet.

In a preferred embodiment of the present invention, the consolidated body of the burnable absorber can be inserted either or both in the center area and the surface area of the sintered nuclear fuel pellet.

According to a preferred embodiment of the present invention, a single or multiple green bodies of the burnable absorber can be inserted in the sintered nuclear fuel pellet, and when multiple green bodies are inserted, they can be same or different in the shape and the size.

In a preferred embodiment of the present invention, the consolidated body of the burnable absorber includes $Gd_2O_3$; $Er_2O_3$; $Gd_2O_3$ stabilized with one or more selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia); $Er_2O_3$ stabilized with one or more selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia); or a combination thereof.

In a preferred embodiment of the present invention, the content of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ can be 1~60 weight % by the volume of $Gd_2O_3$ and $Er_2O_3$.

In a preferred embodiment of the present invention, the consolidated body of the burnable absorber can be inserted at the volume of 2~20% by the total volume of the sintered nuclear fuel pellet.

In a preferred embodiment of the present invention, the consolidated body of the burnable absorber can be included in one or more forms selected from the group consisting of amorphous, cylinder, disk, spherical, rod, film, and polyprism.

According to a preferred embodiment of the present invention, the manufacturing method of the sintered nuclear fuel pellet with the consolidated body of the burnable absorber inserted therein comprises the steps of forming the consolidated body of the absorber; mixing the consolidated body and the nuclear fuel and then inserting the consolidated body in the nuclear fuel; forming the nuclear fuel-consolidated body composite by press-molding the mixture of the nuclear fuel and the consolidated body; and forming the sintered nuclear fuel pellet by sintering the nuclear fuel-consolidated body composite.

In a preferred embodiment of the present invention, the step of forming the consolidated body of the burnable absorber can include the substeps of homogenizing and mixing the burnable absorber powder and press-molding the mixed burnable absorber powder.

In a preferred embodiment of the present invention, the step of press-molding can be composed of the first press-molding at the pressure of 30 MPa~100 MPa and the second press-molding at the pressure of 200 MPa~500 MPa by an hydrostatic press (CIP).

In a preferred embodiment of the present invention, the step of press-molding can be performed at the pressure of 100 MPa~500 MPa just one time.

In a preferred embodiment of the present invention, the step of forming the consolidated body of the burnable absorber can include the substeps of homogenizing and mixing the burnable absorber powder, injecting the burnable absorber powder into the hole of the hollow green body, and pressing the inside of the hole.

In a preferred embodiment of the present invention, the hollow green body can include one or more materials selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$.

In a preferred embodiment of the present invention, the step of pressing can be uniaxial pressing the inside of the hole at the pressure of 30 MPa~100 MPa.

In a preferred embodiment of the present invention, the hollow green body is in the shape of ring or tube, and the volume of the hollow green body is 2~20 volume % by the total volume and the diameter of the hollow is 1~3 mm.

In a preferred embodiment of the present invention, the consolidated body of the burnable absorber includes $Gd_2O_3$; $Er_2O_3$; $Gd_2O_3$ stabilized with one or more selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia); $Er_2O_3$ stabilized with one or more selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia); or a combination thereof.

In a preferred embodiment of the present invention, the content of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia) can be 3~30 weight % by the volume of $Gd_2O_3$ and $Er_2O_3$.

In a preferred embodiment of the present invention, the step of forming the consolidated body of the burnable absorber can additionally include the step of heat-treating the consolidated body of the burnable absorber in a reducing gas atmosphere or an inert gas atmosphere at the temperature of 100° C.~400° C.

In a preferred embodiment of the present invention, the step of forming the nuclear fuel-consolidated body composite can be composed of the first press-molding at the pressure of 30 MPa~100 MPa and the second press-molding at the pressure of 200 MPa~500 MPa by a hydrostatic press (CIP).

In a preferred embodiment of the present invention, the step of forming the nuclear fuel-consolidated body composite can be performed at the pressure of 100 MPa~500 MPa just one time.

In a preferred embodiment of the present invention, the step of forming the sintered nuclear fuel pellet can be performed by sintering at 1000° C.~1800° C. via microwave sintering.

In a preferred embodiment of the present invention, in the step of inserting the consolidated body in the nuclear fuel material, the volume of the consolidated body of the burnable absorber is 1~10 weight % by the total weight of the nuclear fuel material.

Advantageous Effect

According to the present invention, the excess reactivity of a nuclear reactor can be reduced efficiently by inserting the centrally-shielded burnable absorber (CSBA) in the center of the sintered nuclear fuel pellet.

The present invention can optimize the surface area of the burnable absorber to control the combustion rate and self-shielding of the burnable absorber in the nuclear fuel properly.

The present invention can optimize the performance of the nuclear fuel by controlling the size, shape and position of the burnable absorber according to the output and the lifetime of the nuclear fuel.

The present invention can control the position of the consolidated body of the burnable absorber in order to prevent the occurrence of cracks caused by the difference in thermal expansion and phase transformation during sintering and use of the sintered nuclear fuel pellet and to maximize the fuel efficiency.

The present invention is efficient in increasing the lifetime and output of the nuclear fuel by regulating the shape, the size and the volume ratio of the consolidated body of the burnable absorber according to the lifetime and output of the nuclear fuel.

BRIEF DESCRIPTION OF THE DRAWINGS

The application of the preferred embodiments of the present invention is best understood with reference to the accompanying drawings, wherein.

DESCRIPTION OF THE PREFERRED EMBODIMENTS

Figure 1A:
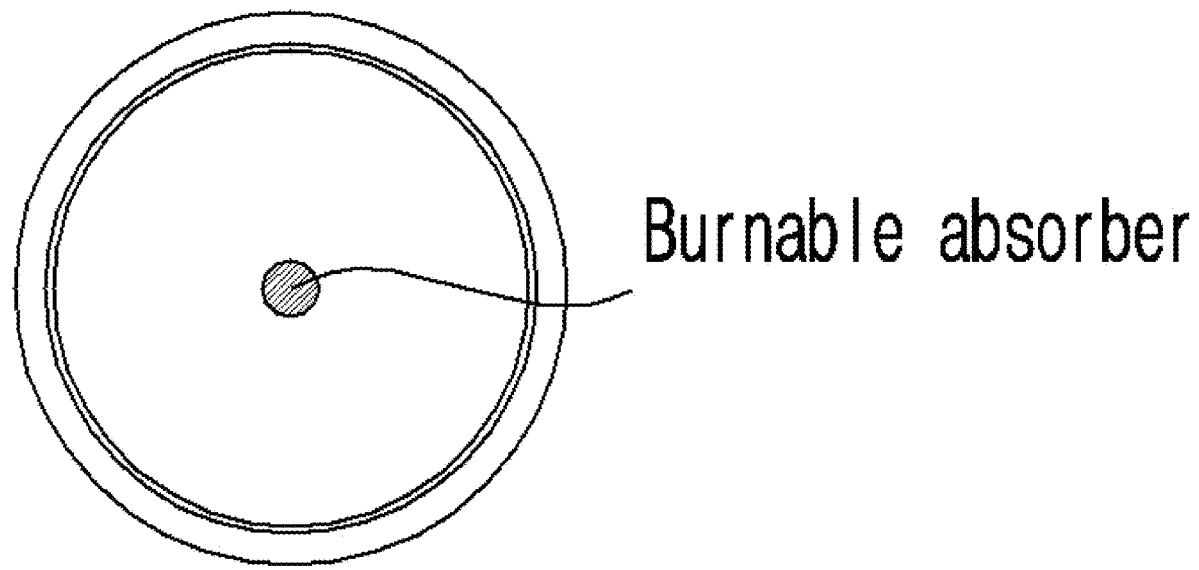
FIG. 1A illustrates the sintered nuclear fuel pellet according to an embodiment of the present invention.
Figure 1B:
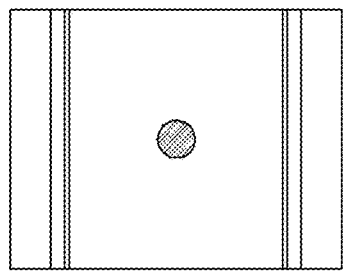
FIG. 1B illustrates the consolidated body of the burnable absorber in various shapes.
Figure 1B:
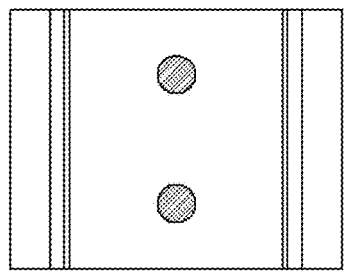
Figure 1B:
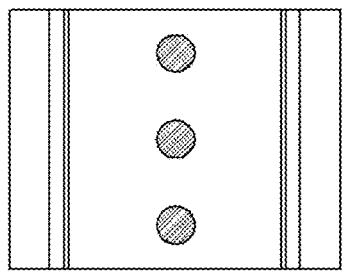
Figure 1B:
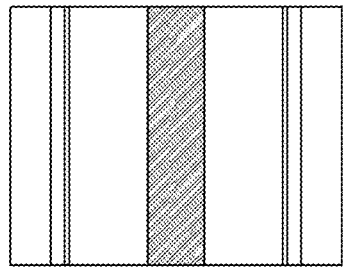
Figure 1B:
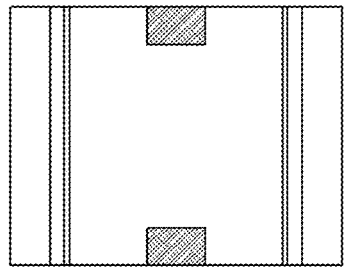
Figure 1B:
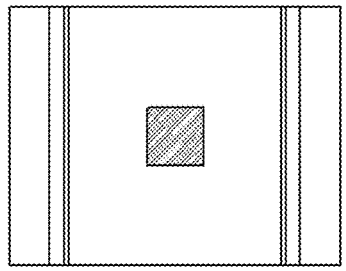

The examples of the present invention are described in more detail with the figures attached hereinafter. In the following description of the present invention, a detailed description of known functions and configurations incorporated herein will be omitted when it may make the subject matter of the present invention rather unclear. The terminologies used herein are the terms used to properly express the preferred embodiments of the present invention, which may vary depending on the user, the intention of the operator, or the practice of the field to which the present invention belongs. Therefore, the definitions of these terms should be based on the contents throughout this specification. The same reference symbols used in each figures indicate the same elements.

The present invention relates to a sintered nuclear fuel pellet. According to a preferred embodiment of the present invention, the sintered nuclear fuel pellet of the present invention can regulate the excess reactivity efficiently and can control the reaction speed and self-shielding of the burnable absorber variably according to the condition of the nuclear fuel.

The present invention relates to a sintered nuclear fuel pellet. According to a preferred embodiment of the present invention, the sintered nuclear fuel pellet can control the volume ratio, the shape, the location of insertion, the size and the number of the burnable absorber variably in order to maximize the performance of the nuclear fuel by applying the consolidated body of the burnable absorber.

According to a preferred embodiment of the present invention, the sintered nuclear fuel pellet can contain the consolidated body of the burnable absorber inserted therein. The consolidated body of the burnable absorber is the kind of a consolidated body prepared by bulk-processing of the burnable absorber, and can be inserted by adjusting its shape freely to exhibit its own shielding property and minimize the excess reactivity.

In an example of the present invention, the consolidated body of the burnable absorber can be porous, which is advantageous for keeping the gas generated by nuclear fission inside the porous burnable absorber and preventing the gas from leaking out of the nuclear fuel even if the burnable absorber is melted.

In an example of the present invention, the volume ratio of the consolidated body of the burnable absorber in the sintered nuclear fuel pellet can be adjusted properly for the optimization of the lifetime and output of the nuclear fuel by regulating the combustion speed and self-shielding. The preferable volume of the consolidated body above in the sintered nuclear fuel pellet is up to 50 volume %, more preferably 2~30 volume %, 2~20 volume %, or 2~10 volume % by the total volume of the sintered nuclear fuel pellet.

In an example of the present invention, the excess reactivity can be optimized by regulating the combustion speed and self-shielding according to the shape, the number, the insertion position, or the size of the consolidated body of the burnable absorber.

For example, the shape of the consolidated body of the burnable absorber above can be one or more shapes selected from the group consisting of amorphous, cylinder, disk, spherical, rod, film, and polyprism. Preferably, the shape of sphere, amorphous, and cylinder can be selected. The combustion speed and self-shielding of the burnable absorber can be regulated according to the shape of the consolidated body of the burnable absorber above.

In a preferred embodiment of the present invention, the consolidated body of the burnable absorber can be inserted singly or plurally. For example, when multiple green bodies are inserted, the green bodies of the burnable absorber can be inserted with the same or different shape and size. When multiple green bodies are inserted, the combustion speed of the burnable absorber can be controlled.

As shown in FIG. 1 A, which illustrates the sintered nuclear fuel pellet of the present invention, only one spherical consolidated body of the burnable absorber is inserted in order to slow down the combustion of the burnable absorber by maximizing the self-shielding effect. On the contrary, if it is needed to speed up the combustion of the burnable absorber by minimizing the self-shielding effect, three spherical green bodies of the burnable absorber in the same volume, like 3 spherical balls, are preferably inserted.

In a preferred embodiment of the present invention, the consolidated body of the burnable absorber can be inserted throughout the sintered nuclear fuel pellet or inserted in the central region, the surface region, or both regions of the sintered nuclear fuel pellet. According to the location of the insertion of the consolidated body of the burnable absorber, the combustion speed and self-shielding can be regulated. When the consolidated body of the burnable absorber is inserted in the center of the sintered nuclear fuel pellet, the increase of temperature according to the excessive nuclear fission in the center of the nuclear fuel can be prevented and the release of the burnable absorber out of the nuclear fuel can be prevented even when the burnable absorber is melted first before the nuclear fuel is melted.

As shown in FIG. 1 B, the consolidated body of the burnable absorber can be in various shapes such as spherical ball core, cylindrical core, surface mini-pellets, mini-pellet core, etc, and the consolidated body can be inserted in different locations.

In a preferred embodiment of the present invention, the size of the consolidated body of the burnable absorber can be up to 10 mm; up to 1 mm, 1 μm~1.5 mm; or 1 μm~900 μm. The size of the consolidated body herein indicates the diameter, radius, or height.

In a preferred embodiment of the present invention, the burnable absorber can be applied without limitation if it is a material that provides a self-shielding effect applicable to nuclear fuel. For example, the burnable absorber can include one or more materials selected from the group consisting of $Gd_2O_3$; $Er_2O_3$; and $Gd_2O_3$ or $Er_2O_3$ stabilized with $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia). Preferably, the burnable absorber can include $Gd_2O_3$; and $Gd_2O_3$ stabilized with $ZrO_2$ or $Y_2O_3$—$ZrO_2$ (yttria-stabilized zirconia).

For example, at least one of $CeO_2$, $In_2O_3$, $Y_2O_3$, $UO_2$, $ThO_2$, $TiO_2$, $ZrO_2$, $Al_2O_3$ and $Y_2O_3$—$ZrO_2$ (yttria-stabilized zirconia) can be included in $Gd_2O_3$ and/or $Er_2O_3$ at the concentration of 1~60 weight % or 3~30 weight %. When the content is within the above range, the phase change is stabilized and the soundness of the sintered body can be improved.

In a preferred embodiment of the present invention, the consolidated body of the burnable absorber can be a structure composed of a core and a shell. For example, the consolidated body can include a core comprising either or both of $Gd_2O_3$ and $Er_2O_3$; and a shell enveloping the core and containing one or more materials selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia). The shell can additionally include either $Gd_2O_3$ or $Er_2O_3$ or both of them.

For example, the $UO_2$ above is a nuclear fuel material, which can inhibit cracking caused by thermal expansion matching in the course of sintering of the sintered nuclear fuel pellet.

In the manufacturing method of the sintered nuclear fuel pellet according to a preferred embodiment of the present invention, the thermal expansion and phase transformation characteristics can be well regulated in the course of sintering by using the consolidated body of the burnable absorber and also the insertion location, the size and the shape of the consolidated body of the burnable absorber can be properly regulated, indicating that the self-shielding can be regulated easily.

According to an example of the present invention, the consolidated body of the burnable absorber can be prepared by press-molding the burnable absorber powder and the nuclear fuel consolidated body can be prepared by inserting the burnable absorber in the nuclear fuel material. Also, the sintered nuclear fuel pellet with the burnable absorber inserted therein can be prepared by sintering the nuclear fuel consolidated body above.

For example, the burnable absorber powder can have the particle size of up to 100 μm; 50 μm; or 100 nm~1 μm.

For example, the content of the consolidated body of the burnable absorber can be 1 weight %~10 weight %; or 2 weight %~4 weight % by the total weight of the nuclear fuel material.

For example, the nuclear fuel consolidated body can be sintered in air, in an inert gas atmosphere, or in a reducing gas atmosphere at 1000° C.~1800° C.; or at 1300° C.~1600° C. for 1 minute~10 hours; 5 minutes~1 hour; or 10 minutes~30 minutes.

For example, the sintering above can be preferably performed by using a sintering furnace or a microwave sintering apparatus and more preferably by using a microwave sintering apparatus.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1

The effect of CSBA on the commercial core was tested through computerized calculation. For the test, a nuclear fuel assembly model used in Westinghouse AP1000 core was considered. CSBA presented in FIG. 1 B was compared with IFBA generally used for AP1000 model. The results are shown in FIG. 2.

Figure 2:
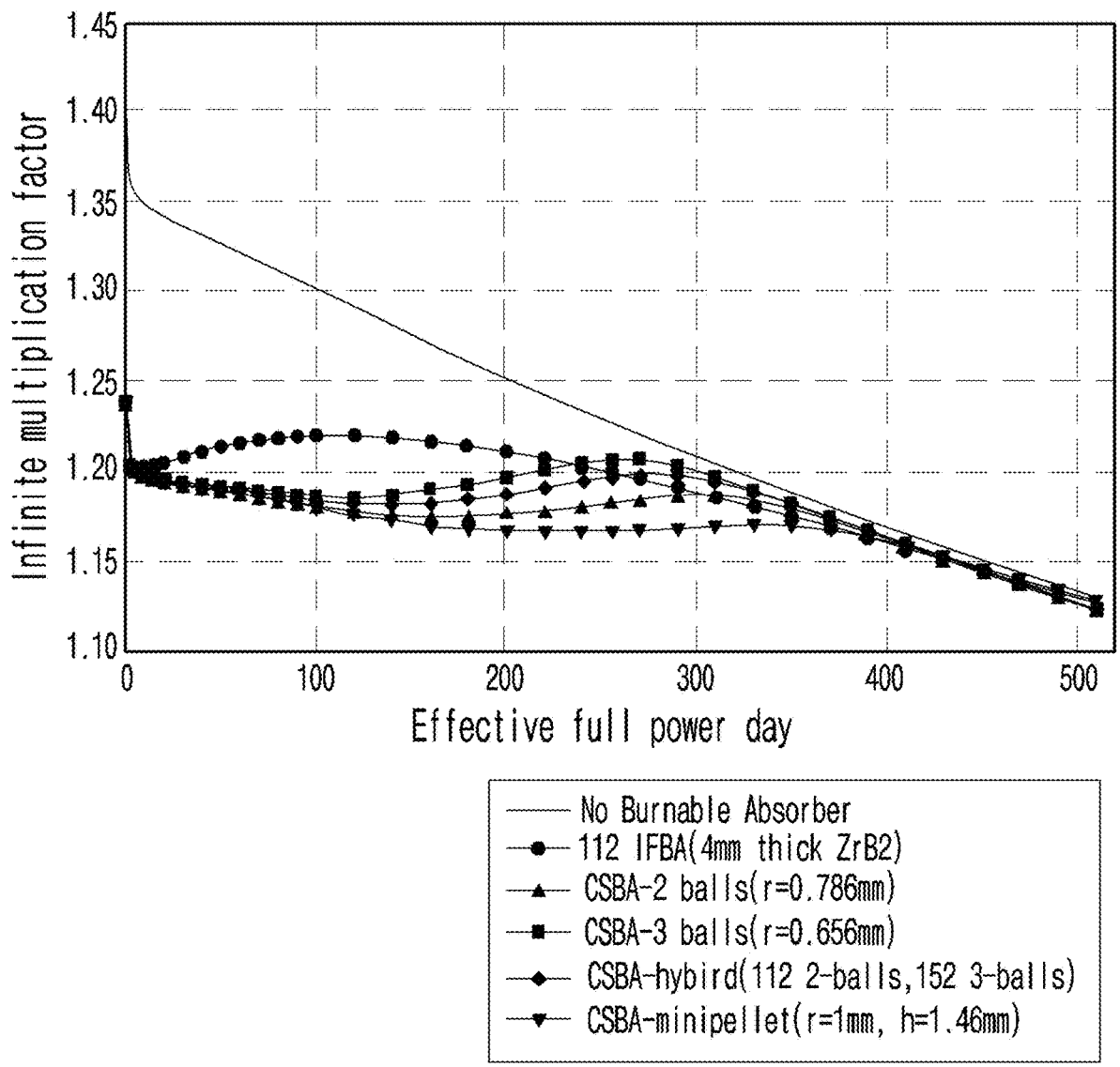
FIG. 2 illustrates the results of the CSBA effect calculated in example 1 of the present invention.

As shown in FIG. 2, better excess reactivity control than IFBA was possible through the optimization of CSBA, and CSBA could be optimized for core design.

The present invention provides a sintered nuclear fuel pellet that can regulate the excess reactivity in nuclear fuel efficiently by regulating the shape, the size, and the insertion location of the consolidated body of the burnable absorber.

According to a preferred embodiment of the present invention, the sintered nuclear fuel pellet can include the consolidated body of the burnable absorber inserted therein. The consolidated body of the burnable absorber is prepared by bulk-processing of the burnable absorber; displays the self-shielding property; can regulate consumption rate of the burnable absorber when the fuel is used; and accordingly can increase the neutron utilization efficiency.

In an example of the present invention, the volume ratio of the consolidated body of the burnable absorber in the sintered nuclear fuel pellet can be adjusted properly for the optimization of the lifetime and output of the nuclear fuel. The preferable volume of the consolidated body above in the sintered nuclear fuel pellet is up to 20 volume %, more preferably 2~20 volume %, 2~10 volume %, or 2~5 volume % by the total volume of the sintered nuclear fuel pellet. When the volume ratio is in that range, the consumption rate of the burnable absorber can be regulated as desired and the thermal expansion and phase transformation characteristics can also be regulated properly, resulting in the prevention of cracking.

In a preferred embodiment of the present invention, the combustion speed of the burnable absorber can be regulated according to the shape, the number, the insertion location, and/or the size of the consolidated body of the burnable absorber, which can also be regulated according to the output and performance of nuclear fuel.

For example, the shape of the consolidated body of the burnable absorber above can be one or more shapes selected from the group consisting of amorphous, cylinder, disk, spherical, rod, film, and polyprism, and is more preferably spherical or cylinder. When the consolidated body of the burnable absorber is in the shape of sphere, the combustion speed of the burnable absorber can be slow down, so that the self-shielding effect can be minimized.

In a preferred embodiment of the present invention, the consolidated body of the burnable absorber can be inserted singly or plurally. For example, when multiple green bodies are inserted, the green bodies of the burnable absorber can be inserted with the same or different shape and size. When multiple green bodies are inserted, the surface area of the burnable absorber is increased, so that the combustion of the burnable absorber can be increased.

For example, the consolidated body of the burnable absorber can be inserted throughout the sintered nuclear fuel pellet or inserted in the central region, the surface region, or both regions of the sintered nuclear fuel pellet. According to the insertion location of the consolidated body of the burnable absorber, the performance of nuclear can be optimized.

Figure 3:
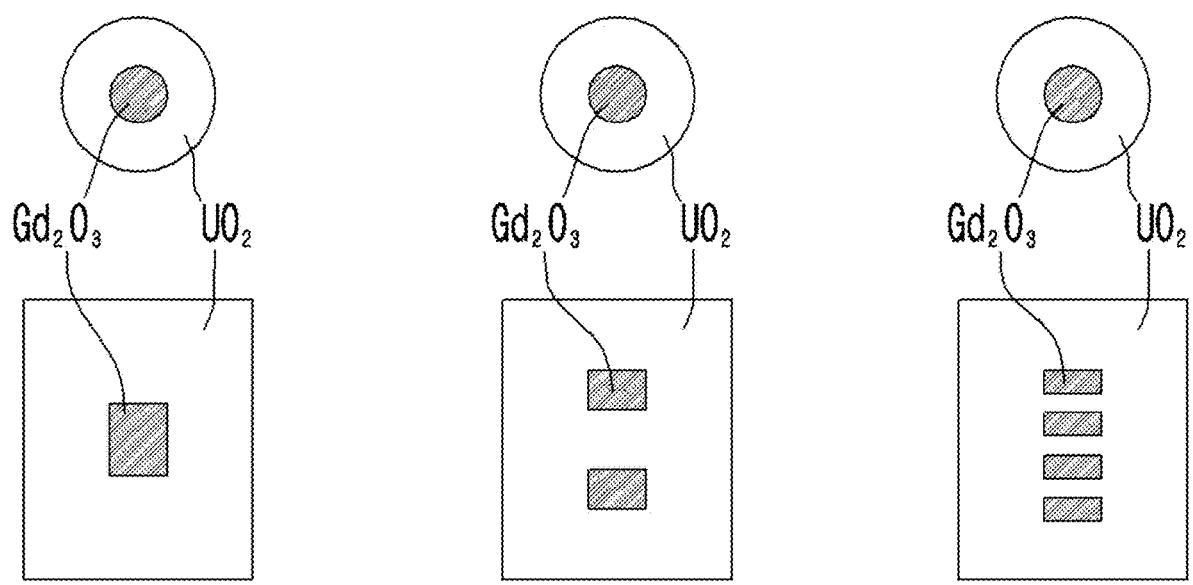
FIG. 3 illustrates the sintered nuclear fuel pellet according to an embodiment of the present invention.
Figure 4:
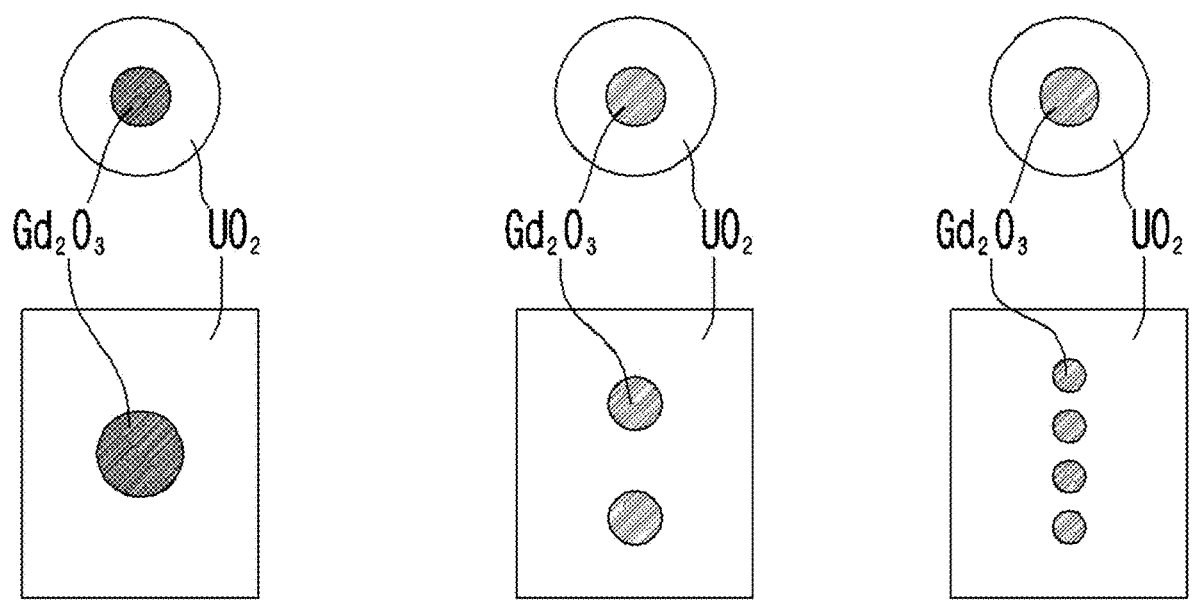
FIG. 4 illustrates the sintered nuclear fuel pellet according to an embodiment of the present invention.

As shown in FIG. 3~FIG. 6, which illustrate the sintered nuclear fuel pellet of the present invention, wherein FIG. 3 illustrates that the cylinder-shaped consolidated body ($Gd_2O_3$) of the burnable absorber was inserted in the nuclear fuel ($UO_2$) and at this time a single or two or three green bodies of the burnable absorber were inserted. These green bodies of the burnable absorber could provide different self-shielding effects according to the number and the size of the inserted green bodies and therefore the combustion speed of the burnable absorber could also be different. FIG. 4 illustrates that the spherical consolidated body ($Gd_2O_3$) of the burnable absorber was inserted in the nuclear fuel ($UO_2$) and at this time a single or two or four green bodies of the burnable absorber were inserted. These green bodies of the burnable absorber could provide different self-shielding effects according to the number and the size of the inserted green bodies and therefore the combustion speed of the burnable absorber could also be different.

In a preferred embodiment of the present invention, the burnable absorber can be applied without limitation if it is a material that provides a self-shielding effect applicable to nuclear fuel. For example, the burnable absorber can include one or more materials selected from the group consisting of $Gd_2O_3$; $Er_2O_3$; and $Gd_2O_3$ and $Er_2O_3$ stabilized with $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia). Preferably, the burnable absorber can include $Gd_2O_3$; and $Gd_2O_3$ stabilized with $ZrO_2$ or $Y_2O_3$—$ZrO_2$ (yttria-stabilized zirconia).

Figure 5:
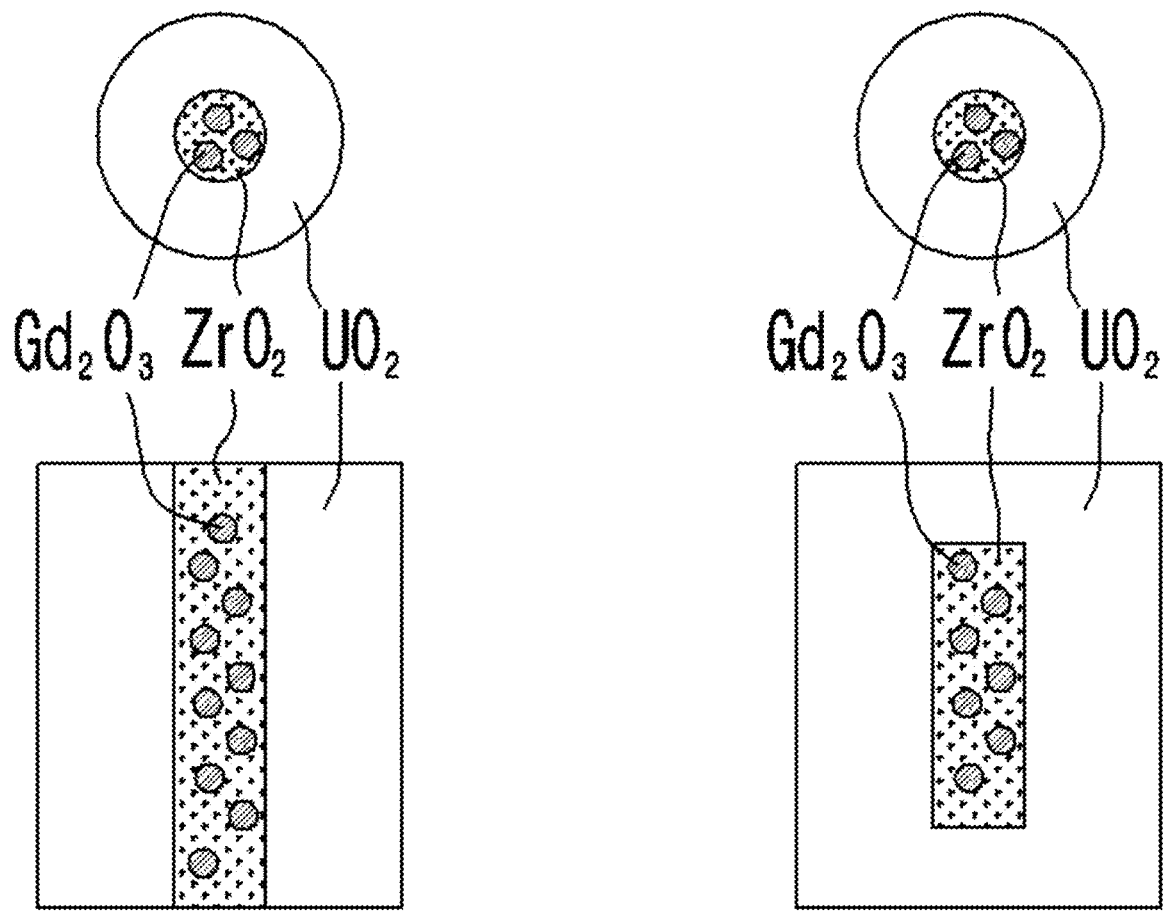
FIG. 5 illustrates the sintered nuclear fuel pellet according to an embodiment of the present invention.

For example, at least one of $CeO_2$, $In_2O_3$, $Y_2O_3$, $UO_2$ $ThO_2$, $TiO_2$, $ZrO_2$, $Al_2O_3$ and $Y_2O_3$—$ZrO_2$ (yttria-stabilized zirconia) can be included in $Gd_2O_3$ and/or $Er_2O_3$ at the concentration of 1~60 weight % or 3~30 weight %. When the content is within the above range, the phase change is stabilized and the soundness of the sintered body can be improved. As shown in FIG. 5, the $ZrO_2$ sintered body containing $Gd_2O_3$ particles could be inserted in the hollow $UO_2$ to prepare a composite sintered body.

In a preferred embodiment of the present invention, the consolidated body of the burnable absorber can be a structure composed of a core and a shell. For example, the consolidated body can include a core comprising either or both of $Gd_2O_3$ and $Er_2O_3$; and a shell enveloping the core and containing one or more materials selected from the group consisting of $CeO_2$, $In_2O_3$, $Y_2O_3$, $UO_2$, $ThO_2$, $TiO_2$, $ZrO_2$, $Al_2O_3$, and $Y_2O_3$—$ZrO_2$ (yttria-stabilized zirconia). The shell can additionally include either $Gd_2O_3$ or $Er_2O_3$ or both of them.

Figure 6:
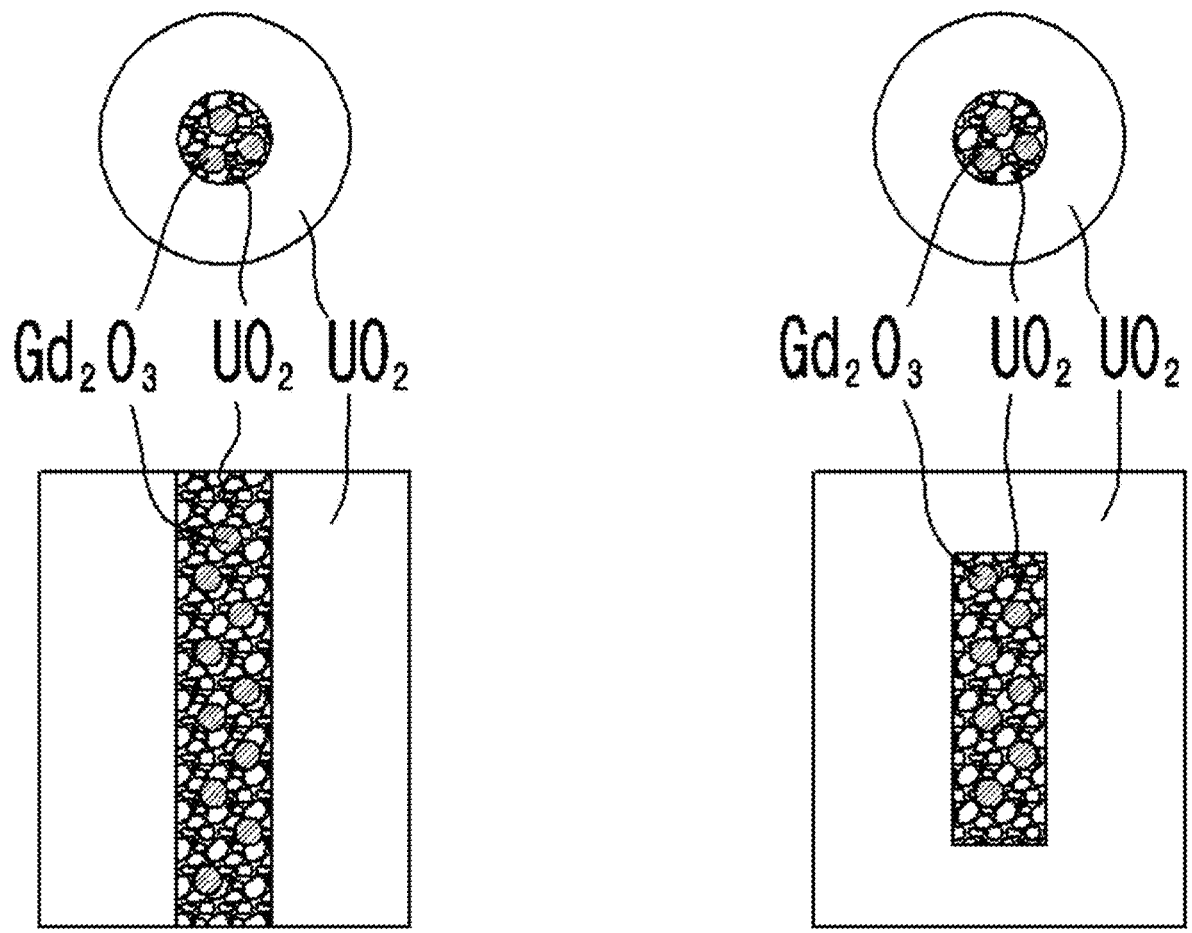
FIG. 6 illustrates the sintered nuclear fuel pellet according to an embodiment of the present invention.

For example, the $UO_2$ above is a nuclear fuel material, which can inhibit cracking caused by thermal expansion matching in the course of sintering of the sintered nuclear fuel pellet. As shown in FIG. 6, the $UO_2$ sintered body containing $Gd_2O_3$ particles could be inserted in the hollow $UO_2$ to prepare a composite sintered body.

The present invention relates to manufacturing method of the sintered nuclear fuel pellet. In the manufacturing method of the sintered nuclear fuel pellet according to a preferred embodiment of the present invention, the thermal expansion and phase transformation characteristics can be well regulated in the course of sintering by using the consolidated body of the burnable absorber and also the insertion location, the size and the shape of the consolidated body of the burnable absorber can be properly regulated in order to optimize the efficiency of the nuclear fuel.

Figure 7:
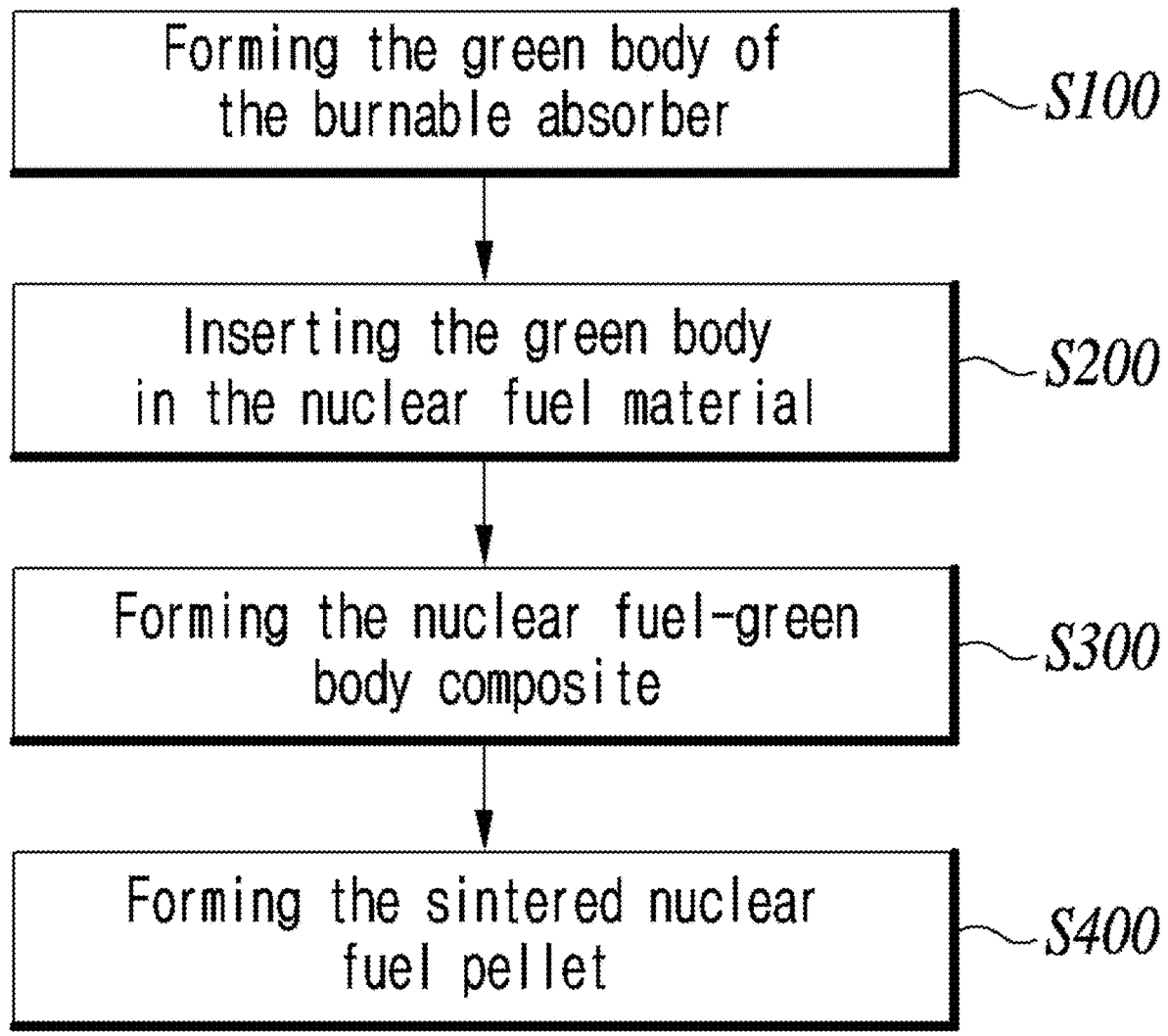
FIG. 7 is a flow chart illustrating the manufacturing method of the sintered nuclear fuel pellet according to an embodiment of the present invention.

As shown in FIG. 7, which illustrates the flow chart of the manufacturing method of the sintered nuclear fuel pellet according to the present invention, the manufacturing method of the sintered nuclear fuel pellet comprises the steps of forming the consolidated body of the burnable absorber (S100); inserting the consolidated body in the nuclear fuel material (S200); forming the nuclear fuel-consolidated body composite (S300); and forming the sintered nuclear fuel pellet (S400).

In a preferred embodiment of the present invention, the step of forming the consolidated body of the burnable absorber (S100) can include the substeps of homogenizing and mixing the burnable absorber powder (S110) and press-molding the mixed burnable absorber powder (S120).

In a preferred embodiment of the present invention; the step of homogenizing and mixing the burnable absorber powder (S110) is a step of crushing and sieving the burnable absorber powders and then mixing thereof. At this time, the burnable absorber powder can have a particle size of up to 100 µm; 50 µm; or 100 nm~1 µm.

In a preferred embodiment of the present invention, the step of press-molding (S120) is a step of injecting the mixed burnable absorber powders obtained in the mixing step (S110) into a mold, followed by press-molding.

For example, the step of press-molding (S120) can be composed of the first press-molding at the pressure of 30 MPa~100 MPa and the second press-molding at the pressure of 200 MPa~500 MPa by s hydrostatic press (CIP).

For example, the step of press-molding (S120) can be performed once via uniaxial pressing at the pressure of 100 MPa~500 MPa.

The press-molding above can be performed at 0° C.~200° C.; 0° C.—room temperature; or 80° C.~150° C.

In another preferred embodiment of the present invention, the step of forming the consolidated body of the burnable absorber (S100) can include the substeps of homogenizing and mixing the burnable absorber powder (S110') and pressing the mixed burnable absorber powder (S120').

In a preferred embodiment of the present invention, the step of homogenizing and mixing the burnable absorber powders (S110') can be performed in the same manner as in the step S110.

In a preferred embodiment of the present invention, the step of pressing (S120') is to prepare the consolidated body of the burnable absorber having the core/shell structure by pressing inside the hole after injecting the burnable absorber powders into the hole of the hollow green body. For example, the step of pressing can be performed via uniaxial pressing inside the hole at the pressure of 30 MPa~100 MPa.

For example, the hollow green body can be a ceramic having a high melting point and a neutron transparency.

In an example, the hollow green body can contain one or more materials selected from the group consisting of $CeO_2$, $In_2O_3$, $Y_2O_3$, $UO_2$, $ThO_2$, $TiO_2$, $ZrO_2$, $Al_2O_3$, $Y_2O_3$—$ZrO_2$ (yttria-stabilized zirconia), and $UO_2$, and is preferably a material having the same high melting point as $ZrO_2$ and $ZrO_2$.

For example, the burnable absorber powder forming the core can include the burnable absorber mentioned before in the description of the sintered nuclear fuel pellet.

In an example of the invention, the core and the shell can contain different burnable absorbers and if they contain the same burnable absorber, the mixing ratio can be differently regulated.

In a preferred embodiment of the present invention, the hollow green body can be in the shape of a ring or a tube. The volume of the hollow is preferably 2~20 weight % by the total volume of the hollow green body, and the diameter of the hollow is 1~3 mm. The reactivity of the consolidated body of the burnable absorber can be appropriately controlled depending on the volume ratio and the diameter of the hollow.

In a preferred embodiment of the present invention, the step of forming the consolidated body of the burnable absorber (S100) can additionally include a step of heat-treating the consolidated body of the burnable absorber (S130). For example, the step of heat-treating the consolidated body (S130) can be performed in air, a reducing gas atmosphere, or an inert gas atmosphere at the temperature of 100° C.~400° C.; or 200° C.~300° C. for 1 minute~5 hours; for 5 minutes~1 hour; or for 10 minutes~30 minutes. In an example of the invention, the step of heat-treating the consolidated body (S130) is performed by using a sintering furnace or a microwave sintering apparatus.

In an example of the present invention, the step of inserting the consolidated body of the burnable absorber into the nuclear fuel material (200) is a step of inserting the consolidated body of the burnable absorber into the nuclear fuel material by mixing the nuclear fuel material and the consolidated body of the burnable absorber in a mold. In this step (200), the insertion location and the number of the consolidated body of the burnable absorber can be regulated.

In an example of the present invention, the consolidated body of the burnable absorber can be mixed with the nuclear fuel material at the volume of 1~10 weight % or 2~4 weight % by the total weight of the nuclear fuel material.

In an example of the present invention, the step of forming the nuclear fuel-consolidated body composite (S300) is a step of forming the nuclear fuel-consolidated body composite by press-molding the mixture of the consolidated body and the nuclear fuel after the step of inserting the consolidated body (200).

For example, the press-molding (S120) can be composed of the first press-molding performed at the pressure of 30 MPa~100 MPa and the second press-molding performed at the pressure of 200 MPa~500 MPa by s hydrostatic press (CIP).

For example, the press-molding can be performed once at the pressure of 100 MPa~500 MPa.

The press-molding above can be performed at 0° C.~200° C.; 0° C.—room temperature; or 80° C.~150° C.

In a preferred embodiment of the present invention, the step of forming the sintered nuclear fuel pellet (S400) is a step of sintering the nuclear fuel-consolidated body composite to form the sintered nuclear fuel pellet.

In an example of the present invention, the step of forming the sintered nuclear fuel pellet (S400) is performed by sintering in air, in an inert gas atmosphere, or in a reducing gas atmosphere at 1000° C.~1800° C.; or at 1300° C.~1600° C. for 1 minute 10 hours; 5 minutes 1 hour; or 10 minutes 30 minutes.

For example, the step of forming the sintered nuclear fuel pellet (S400) above can be preferably performed by using a sintering furnace or a microwave sintering apparatus and more preferably by using a microwave sintering apparatus.

Example 2

(1) Preparation of Consolidated Body

The mixed powders of $ZrO_2$-8 mol. % $Y_2O_3$(Sigma Aldrich. 99.9%, 8YSZ) and $Gd_2O_3$(Sigma Aldrich. 99.9%, <10 μm) were pressurized at 33.5 MPa, and then CIP was performed at 400 MPa. As a result, $Gd_2O_3$, $Gd_2O_3$-5 wt % 8YSZ, $Gd_2O_3$-10 wt % 8YSZ, $Gd_2O_3$-20 wt % 8YSZ, $Gd_2O_3$-30 wt % 8YSZ, and $Gd_2O_3$-40 wt % 8YSZ pellets were obtained.

(2) Preparation of Sintered Body

The obtained pellets were sintered in a microwave sintering apparatus at 1400° C., 1500° C., and 1600° C. for 20 minutes each. As a result, $Gd_2O_3$-5 wt % 8YSZ, $Gd_2O_3$-10 wt % 8YSZ, $Gd_2O_3$-20 wt % 8YSZ, $Gd_2O_3$-30 wt % 8YSZ, and $Gd_2O_3$-40 wt % 8YSZ sintered bodies were obtained. The XRD patterns of those sintered bodies were measured and shown in FIG. 8.

Figure 8:
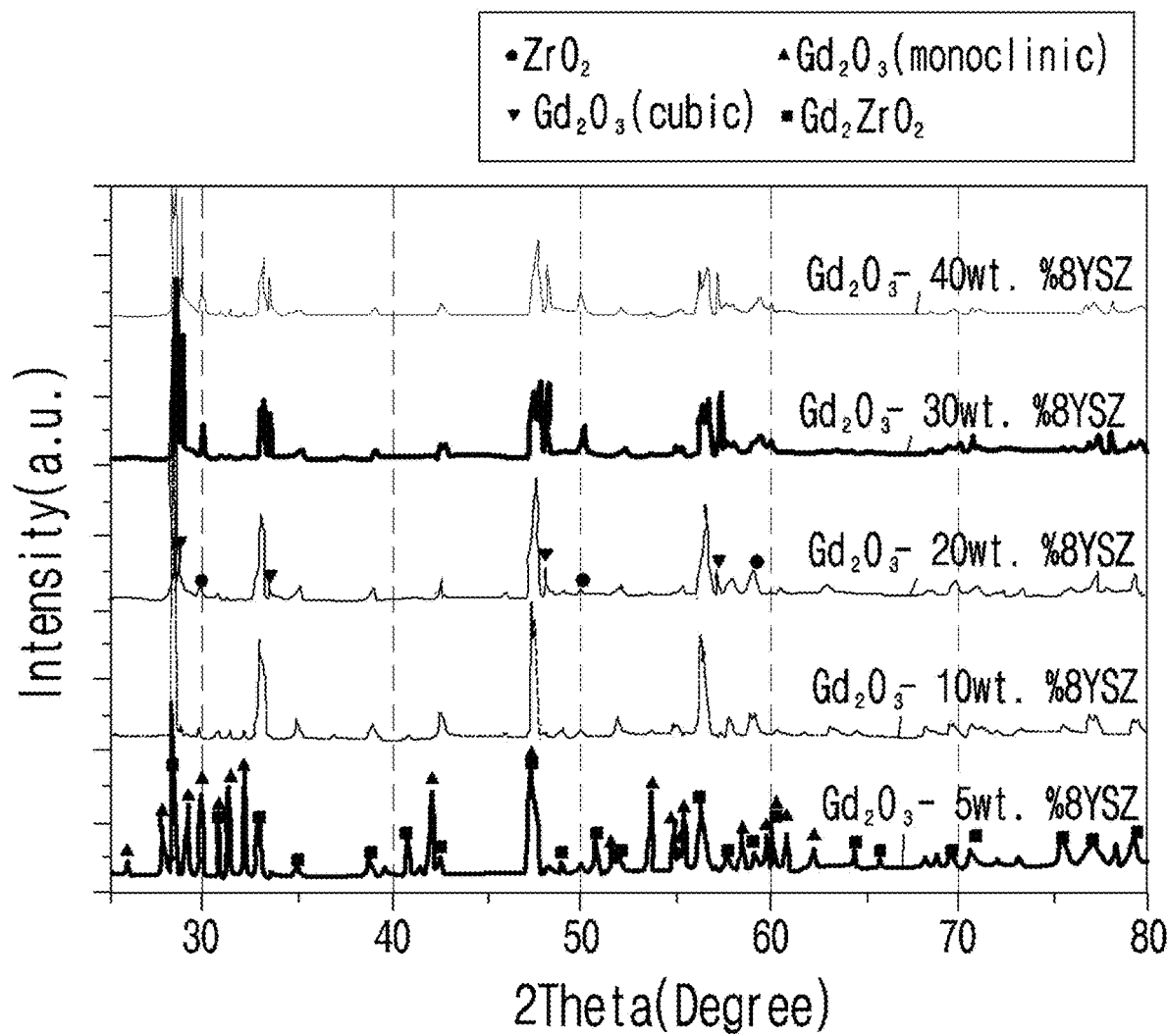
FIG. 8 illustrates the results of XRD of the sintered body of the burnable absorber prepared in example 2 of the present invention.

As shown in FIG. 8, when yttria-stabilized zirconia was added to gadolinia at the concentration of 5 wt %~40 wt %, gadolinia was stabilized in a cubic phase from the concentration of 10 wt %. Since the phase change does not occur on the cubic phase to the monoclinic phase during sintering, the soundness of the sintered body can be improved Example 3

$Gd_2O_3$ (Sigma Aldrich. 99.9%, <10 μm) powder was molded by uniaxial pressing at a low pressure of 30~50 MPa and then crushed into large lumps, which were rotated in a ball mill to prepare amorphous particles through granulation. The size of the assembled $Gd_2O_3$ particles was hundreds μm~several mm. The mixed powders of the assembled $Gd_2O_3$ particles and $ZrO_2$-8 mol. % $Y_2O_3$ (Sigma Aldrich. 99.9%, 8YSZ) were pressurized at 33.5 MPa, and then CIP was performed at 400 MPa. As a result, $Gd_2O_3$, 30 wt % $Gd_2O_3$-70 wt % 8YSZ, and 50 wt % $Gd_2O_3$-50 wt % 8YSZ pellets were obtained.

The pellets and $ZrO_2$-8 mol. % $Y_2O_3$(Sigma Aldrich. 99.9%, 8YSZ) were placed in a mold, pressurized at 33.5 MPa, and then CIP was performed at 400 MPa. As a result, the nuclear fuel-consolidated body composite with the $Gd_2O_3$, 30 wt % $Gd_2O_3$-70 wt % 8YSZ, and 50 wt % $Gd_2O_3$-50 wt % 8YSZ pellets inserted into the core was prepared. The nuclear fuel-consolidated body composite was sintered in a microwave sintering apparatus at 1600° C. for 20 minutes to prepare the sintered nuclear fuel pellet. The SEM images of the prepared sintered body are shown in FIG. 9.

Figure 9:
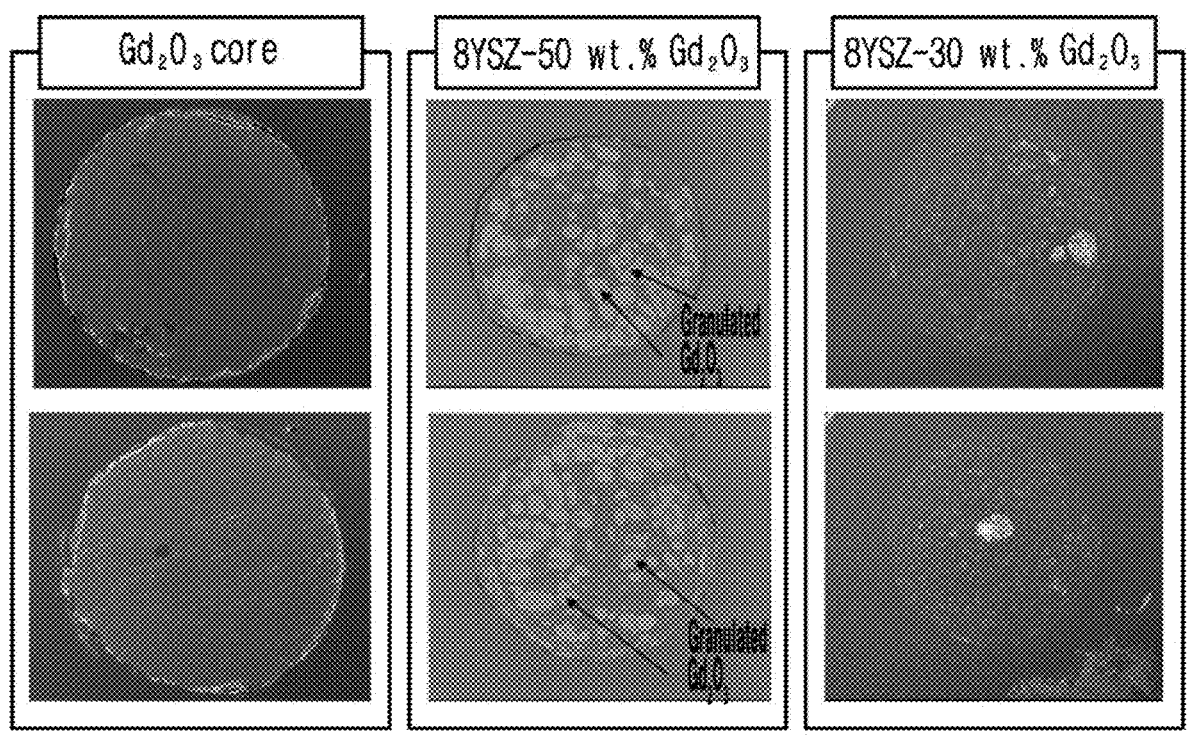
FIG. 9 is a set of SEM images illustrating the sintered nuclear fuel pellet prepared in example 3 of the present invention.

As shown in FIG. 9, it was confirmed that the sintered nuclear fuel pellet with the $Gd_2O_3$, 30 wt % $Gd_2O_3$-70 wt % 8YSZ, and 50 wt % $Gd_2O_3$-50 wt % 8YSZ pellets inserted therein was formed.

The method of the present invention can produce the sintered nuclear fuel pellet by applying the consolidated body of the burnable absorber thereto, so that the invention is advantageous in providing the sintered nuclear fuel pellet that can overcome the problem of the irregularity of the burnable absorber in the nuclear fuel; prevent the occurrence of cracks caused by the difference in thermal expansion and phase transformation during sintering; and increase the efficiency of the nuclear fuel. The present invention can regulate the insertion location, the size, and the shape of the consolidated body of the burnable absorber in order to optimize the lifetime and output of the nuclear fuel.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A sintered nuclear fuel pellet comprising nuclear fuel, wherein the sintered nuclear fuel pellet includes a burnable absorber consisting of one or more consolidated bodies,
wherein the one or more consolidated bodies of the burnable absorber is inside of the nuclear fuel pellet, wherein
the one or more consolidated bodies is in the nuclear fuel pellet at a volume fraction of 2~20 percent volume by the total volume of the nuclear fuel pellet,
all of the one or more consolidated bodies do not comprise nuclear fuel, and
all of the one or more consolidated bodies are located in a radially central region of the nuclear fuel pellet,
such that all of the one or more consolidated bodies are surrounded by the nuclear fuel in all directions without the one or more consolidated bodies being exposed to an outside of the nuclear fuel pellet, and
wherein only the radially central region includes burnable absorber material,
such that area of the nuclear fuel pellet located outside of the radially central region is free of burnable absorber material.

2. The sintered nuclear fuel pellet according to claim 1, wherein either a combustion speed or self-shielding effect of the burnable absorber, or both are controlled by regulating a size, shape, or insertion location of the one or more consolidated bodies of the burnable absorber.

3. The sintered nuclear fuel pellet according to claim 1, wherein the one or more consolidated bodies of the burnable absorber includes Gd2O3; Er2O3; Gd2O3 stabilized with one or more selected from the group consisting of CeO2, In2O3, Y2O3, TiO2, ZrO2, Al2O3, and Y2O3-ZrO2 (yttria-stabilized zirconia); Er2O3 stabilized with one or more selected from the group consisting of CeO2, In2O3, Y2O3, TiO2, ZrO2, Al2O3, and Y2O3-ZrO2 (yttria-stabilized zirconia); or a combination thereof.

4. The sintered nuclear fuel pellet according to claim 3, wherein the CeO2, In2O3, Y2O3, TiO2, ZrO2, Al2O3, and Y2O3-ZrO2 are included in Gd2O3 and Er2O3 at a concentration of 1~60 weight %.

5. A method of manufacturing a sintered nuclear fuel pellet comprising the following steps:
forming one or more consolidated bodies of a burnable absorber;
inserting the one or more consolidated bodies in nuclear fuel;
forming a nuclear fuel-consolidated body composite by press-molding a mixture of the nuclear fuel and the one or more consolidated bodies; and
forming a sintered nuclear fuel pellet by sintering the nuclear fuel-consolidated body composite,
wherein the sintered nuclear fuel pellet includes the burnable absorber consisting of the one or more consolidated bodies,
wherein the one or more consolidated bodies of the burnable absorber is inside of the nuclear fuel pellet, wherein
the one or more consolidated bodies is in the nuclear fuel pellet at a volume fraction of 2~20 percent volume by the total volume of the nuclear fuel pellet,
all of the one or more consolidated bodies do not comprise nuclear fuel, and
all of the one or more consolidated bodies are located in a radially central region of the nuclear fuel pellet,
such that all of the one or more consolidated bodies are surrounded by the nuclear fuel in all directions without the one or more consolidated bodies being exposed to an outside of the nuclear fuel pellet, and
wherein only the radially central region includes burnable absorber material,
such that area of the nuclear fuel pellet located outside of the radially central region is free of burnable absorber material.

6. The method of manufacturing according to claim 5, wherein the step of forming the one or more consolidated bodies of the burnable absorber comprises the following substeps:
homogenizing and mixing burnable absorber powder; and
press-molding the mixed burnable absorber powder.

7. The method of manufacturing according to claim 6, wherein the step of press-molding the mixed burnable absorber powder comprises
a first press-molding at a pressure of 30 MPa~100 MPa and
a second press-molding at a pressure of 200 MPa~500 MPa by a hydrostatic press (CIP).

8. The method of manufacturing according to claim 6, wherein the step of press-molding the mixed burnable absorber powder is performed once at a pressure of 100 MPa~500 MPa.

9. The method of manufacturing according to claim 5, wherein the step of forming the one or more consolidated bodies of the burnable absorber comprises the following substeps:
homogenizing and mixing burnable absorber powder; and
injecting the burnable absorber powder into a hole of a hollow green body of nuclear fuel, and pressing an inside of the hole.

10. The method of manufacturing according to claim 9, wherein the hollow green body of nuclear fuel includes one or more materials selected from the group consisting of CeO2, In2O3, Y2O3, TiO2, ZrO2, Al2O3, and Y2O3-ZrO2.

11. The method of manufacturing according to claim 9, wherein the step of pressing is performed by uniaxial pressing the inside of the hole at a pressure of 30 MPa~100 MPa.

12. The method of manufacturing according to claim 9, wherein the hollow green body of nuclear fuel is in the shape of a ring or a tube, and a diameter of the hollow is 1~3 mm.

13. The method of manufacturing according to claim 9, wherein the one or more consolidated bodies of the burnable absorber includes Gd2O3; Er2O3; Gd2O3 stabilized with one or more selected from the group consisting of CeO2, In2O3, Y2O3, TiO2, ZrO2, Al2O3, and Y2O3-ZrO2 (yttria-stabilized zirconia); Er2O3 stabilized with one or more selected from the group consisting of CeO2, In2O3, Y2O3, TiO2, ZrO2, Al2O3, and Y2O3-ZrO2 (yttria-stabilized zirconia); or a combination thereof.

14. The method of manufacturing according to claim 13, wherein the one or more selected from the group consisting of CeO2, In2O3, Y2O3, TiO2, ZrO2, Al2O3, and Y2O3-ZrO2 (yttria-stabilized zirconia) are included in Gd2O3 or Er2O3 at a concentration of 3~30 weight %.

* * * * *